(12) United States Patent
D'Errico et al.

(10) Patent No.: US 9,948,389 B2
(45) Date of Patent: Apr. 17, 2018

(54) OPTICAL CARRIER SELECTOR SYSTEM AND METHOD

(71) Applicant: TELEFONAKTIEBOLAGET LM ERICSSON (PUBL), Stockholm (SE)

(72) Inventors: Antonio D'Errico, Pisa (IT); Piero Castoldi, Pisa (IT); Claudio Porzi, Pisa (IT); Nicola Sambo, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/116,014

(22) PCT Filed: Feb. 14, 2014

(86) PCT No.: PCT/EP2014/052911
§ 371 (c)(1),
(2) Date: Aug. 2, 2016

(87) PCT Pub. No.: WO2015/120903
PCT Pub. Date: Aug. 20, 2015

(65) Prior Publication Data
US 2017/0170895 A1    Jun. 15, 2017

(51) Int. Cl.
*H04B 10/08* (2006.01)
*H04B 10/079* (2013.01)
*H04J 14/02* (2006.01)

(52) U.S. Cl.
CPC .... *H04B 10/07955* (2013.01); *H04J 14/0212* (2013.01); *H04J 14/0221* (2013.01); *H04J 14/0256* (2013.01); *H04J 14/0298* (2013.01)

(58) Field of Classification Search
CPC ............... H04J 14/0212; H04J 14/0221; H04J 14/0256; H04J 14/0298; H04B 10/07955
(Continued)

(56) References Cited

U.S. PATENT DOCUMENTS

2003/0128980 A1    7/2003  Abeles
2008/0240725 A1*  10/2008  Yokoyama ............. H04B 10/40
                                                      398/139
(Continued)

FOREIGN PATENT DOCUMENTS

EP         1986293 A2     10/2008
WO    2004088373 A1     10/2004

OTHER PUBLICATIONS

Chen et al., "Compact bandwidth-tunable microring resonators," Optics Letters, Nov. 15, 2007, vol. 32, No. 22.
(Continued)

Primary Examiner — M. R. Sedighian
(74) Attorney, Agent, or Firm — Patent Portfolio Builders PLLC

(57) ABSTRACT

An optical carrier selector system is provided for selecting a wanted carrier signal from a multi-carrier signal comprising a plurality of carrier signals. The optical carrier selector system comprises a series of optical filter devices. Each optical filter device of the series comprises an input port for receiving a signal comprising two or more carrier signals, each optical filter device being configured to filter out an unwanted carrier signal. Each optical filter device also comprises an output port for outputting at least the wanted carrier signal and any remaining signals that have not been filtered out by that particular optical filter device, and a drop port for outputting the unwanted carrier signal that is being filtered out by the respective optical filter device. By outputting from a drop port the unwanted carrier signal that is being filtered out by the respective optical filter device, this has the advantage of enabling the operation of the optical carrier selector system to be monitored for proper operation, and controlled or adjusted if necessary.

17 Claims, 11 Drawing Sheets

(58) Field of Classification Search
USPC .............................................. 398/38, 85, 83
See application file for complete search history.

(56) References Cited

U.S. PATENT DOCUMENTS

2009/0220228 A1\* 9/2009 Popovic ............. G02B 6/12007
398/48
2012/0207477 A1\* 8/2012 Takeguchi .......... H04J 14/0204
398/79

OTHER PUBLICATIONS

Amatya et al., "Low Power Thermal Tuning of Second-order Microring Resonators," 2007 Conference on Lasers and Electro-Optics (CLEO), May 6-11, 2007, Baltimore, MD.

Anandarajah et al., "Flexible Optical Comb Source for Super Channel Systems," Optical Fiber Communication Conference and Exposition and the National Fiber Optic Engineers Conference (OFC/NFOEC) 2013, Mar. 17-21, 2013, Anaheim, CA.

International Search Report dated Oct. 20, 2014 in related International Application No. PCT/EP2014/052911.

Pozo et al., "Silicon on Insulator Photonic Integrated Sensors: On-Chip Sensing and Interrogation," 2011 13th International Conference on Transparent Optical Networks (ICTON), Jun. 26-30, 2011, Stockholm, SE.

Rasras et al., "Demonstration of a Tunable Microwave-Photonic Notch Filter Using Low-Loss Silicon Ring Resonators," Journal of Lightwave Technology, Jun. 15, 2009, vol. 27, No. 12.

Sambo et al., "Software Defined Code-rate-adaptive Terabit/s based on Time-frequency Packing," Optical Fiber Communication Conference and Exposition and the National Fiber Optic Engineers Conference (OFC/NFOEC) 2013, Mar. 17-21, 2013, Anaheim, CA.

Xia et al., "Ultra-compact high order ring resonator filters using submicron silicon photonic wires for on-chip optical interconnects," Optics Express, Sep. 17, 2007, vol. 15, No. 19.

Yariv, "Critical Coupling and Its Control in Optical Waveguide-Ring Resonator Systems," IEEE Photonics Technology Letters, Apr. 2002, vol. 14, No. 4.

\* cited by examiner

OPTICAL CARRIER SELECTOR SYSTEM AND METHOD

TECHNICAL FIELD

The present invention relates to an optical carrier selector system and method, and in particular to an optical carrier selector system and method for selecting a carrier signal from a multi-carrier signal.

BACKGROUND

In the next generation of optical network infrastructures, high line rates, for example in the order of 400 Gb/s or 1 Tb/s, will be supported by so-called super-channels. Super-channels are connections that are composed of multiple optical carriers (also known as sub-carriers).

Each optical carrier may be obtained through a dedicated laser source, for example as described in a paper entitled "Software defined code-rate-adaptive Terabit/s based on time frequency packing", by N. Sambo et al, Proceedings of the Optical Fiber Communication Conference and Exposition, and the National Fiber Optic Engineers Conference (OFC/NFOEC), March 2013. A disadvantage of generating a super-channel using multiple lasers sources is that the instability of each laser source may generate carrier frequency overlapping, which in turn may cause high signal degradation, especially in spectral-efficient transmissions such as Nyquist and Faster-than-Nyquist transmissions.

An alternative approach to using a dedicated laser for each carrier is to obtain carriers from a single multi-wavelength source, i.e. a source that is able to generate multiple carriers using a single laser source. An example of a multi-wavelength source is disclosed in a paper entitled "Flexible optical comb source for super channel systems", by P. Anandarajah et al, OFC/NFOEC, March 2013. In contrast to the above, any instability of the laser source, exploited by the multi-wavelength source, has the advantage of not generating any carrier overlapping, given that the spacing among carriers does not change. Another advantage of using a multi-wavelength source is that the number of lasers in the network can be reduced.

In the case where carriers are generated through such a multi-wavelength source, the individual carriers must be selected from the multi-carrier signal, for example to be modulated by specific data. As an example, if 100 Gb/s information-rate carriers are assumed, each carrier should be modulated by traffic coming from a specific 100 GbE interface. Thus, a carrier has to be selected and then modulated by that specific traffic.

Moreover, in a flex-grid optical infrastructure, the spacing among carriers can be tunable (based on the rate and modulation format of each carrier). However, it is difficult to select carriers generated by a multi-wavelength source, particularly in a system where tunable channel spacing among carriers is provided, such as in a flexi-grid infrastructure.

A bandwidth variable wavelength selective switch (BV-WSS) or wavelength selective switch (WSS) can be used to select an individual carrier from a multi-wavelength source, whereby a BV-WSS or WSS is tuned to pass a particular wanted signal 100 at frequency $f_W$, as shown in FIG. 1. However, the use of BV-WSSs and WSSs imply high costs, and they cannot be easily integrated with the source. Moreover, WSSs cannot be used in an arrangement requiring tunable carrier spacing, because WSSs work on an optical infrastructure having a fixed grid.

SUMMARY

It is an aim of the present invention to provide a method and apparatus which obviate or reduce at least one or more of the disadvantages mentioned above.

According to a first aspect of the present invention there is provided an optical carrier selector system for selecting a wanted carrier signal from a multi-carrier signal comprising a plurality of carrier signals. The optical carrier selector system comprises a series of optical filter devices. Each optical filter device of the series comprises an input port for receiving a signal comprising two or more carrier signals, each optical filter device being configured to filter out an unwanted carrier signal. Each optical filter device further comprises an output port for outputting at least the wanted carrier signal and any remaining signals that have not been filtered out by that particular optical filter device. Each optical filter device also comprises a drop port for outputting the unwanted carrier signal that is being filtered out by the respective optical filter device.

By outputting from a drop port the unwanted carrier signal that is being filtered out by the respective optical filter device, this has the advantage of enabling the operation of the optical carrier selector system to be monitored for proper operation, and controlled or adjusted if necessary. Furthermore, by providing a series of optical filter devices for removing unwanted carrier signals, such an arrangement is suitable for applications where the optical carrier selector system must be re-tuned to select a different carrier signal having a different frequency, and to deal with different frequency spacing between carrier signals.

According to another aspect of the present invention there is provided a method of controlling the operation of one or more stages of an optical carrier selector system, wherein each stage of an optical carrier selector system comprises a series of optical filter devices for selecting a wanted carrier signal from a multi-carrier signal comprising multiple carrier signals. The method comprises, at each optical filter device, performing the steps of: receiving at an input port a signal comprising two or more carrier signals; filtering out an unwanted carrier signal; outputting from an output port at least the wanted carrier signal and any remaining signals that have not been filtered out; and outputting from a drop port the unwanted carrier signal that was filtered out by the filtering step.

According to another aspect of the present invention there is provided an optical carrier selector arrangement comprising a plurality of optical carrier selector systems. Each optical carrier selector systems configured to select a wanted carrier signal from a multi-carrier signal comprising a plurality of carrier signals. The optical carrier selector system comprises a series of optical filter devices. Each optical filter device of the series comprises an input port for receiving a signal comprising two or more carrier signals. Each optical filter device is configured to filter out an unwanted carrier signal. The optical filter devices comprise an output port for outputting at least the wanted carrier signal and any remaining signals that have not been filtered out by that particular optical filter device, and a drop port for outputting the unwanted carrier signal that is being filtered out by the respective optical filter device.

BRIEF DESCRIPTION OF THE DRAWINGS

For a better understanding of examples of the present invention, and to show more clearly how the examples may be carried into effect, reference will now be made, by way of example only, to the following drawings in which:

FIG. 4b shows an example of the band-notch characteristic of a MRR of FIG. 4a;

DETAILED DESCRIPTION

In the embodiments described below, reference is made to selecting a carrier signal from a multi-carrier signal. It is noted that this is intended to include, among other things, selecting a carrier signal from a comb of multiple carrier signal, each having a different frequency, or selecting a spectral component from a multi-wavelength source (e.g. from a multi-wavelength source having a plurality of discrete wavelengths or from a continuous spectral waveform having multiple spectral components), or selecting an optical channel from a multi-channel optical source, or selecting a sub-carrier frequency from a multi-frequency source. Aspects of the invention may relate to any of these types or terms for light, and reference to one type or term may be interchanged with any other type or term.

Figure 1:
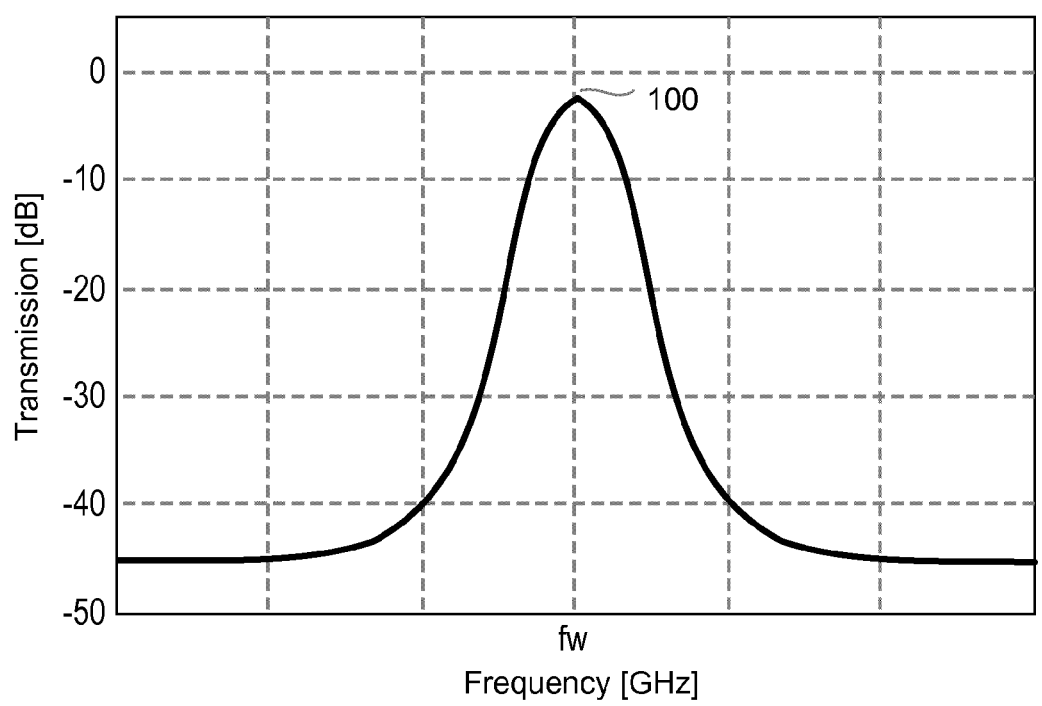
FIG. 1 shows the band pass characteristics of a BV-WSS or WSS according to the prior art.
Figure 2:
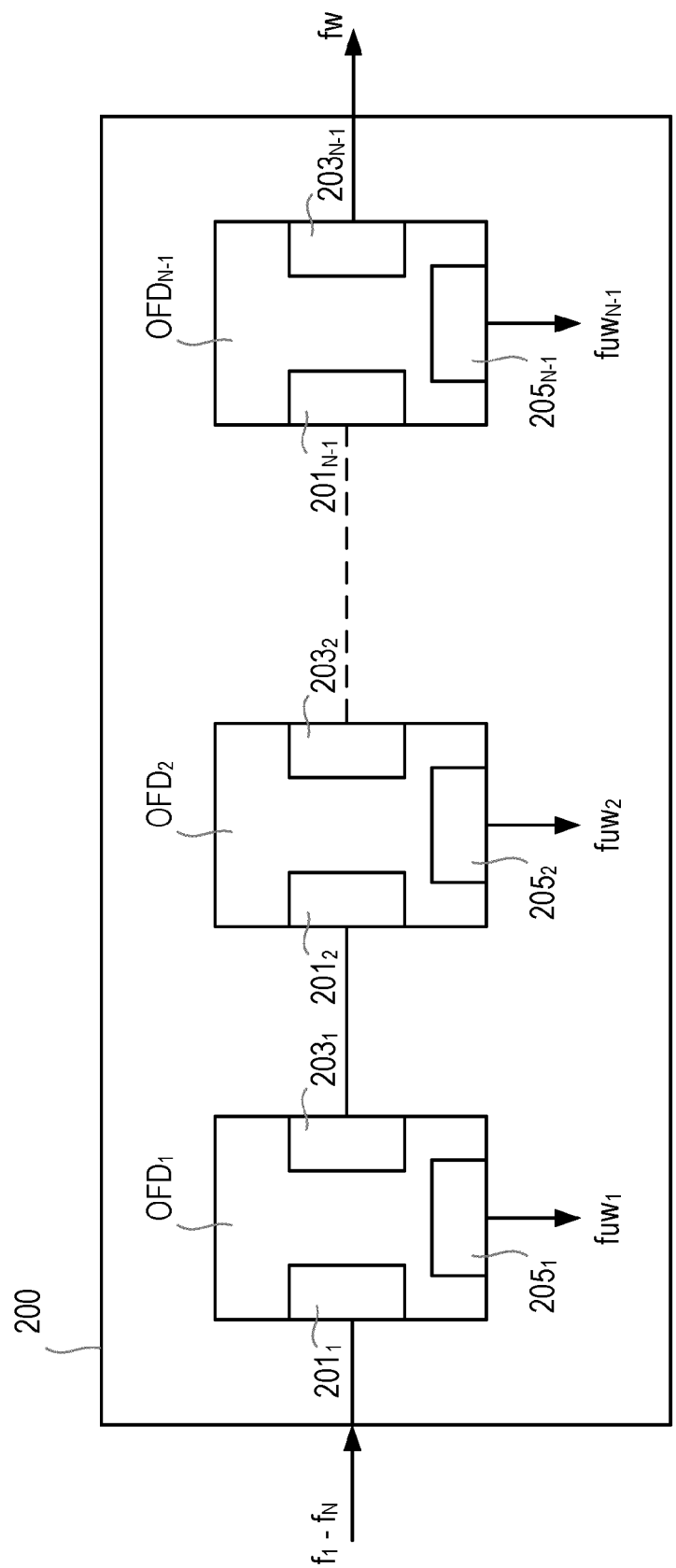
FIG. 2 shows an optical carrier selector system according to an embodiment of the present invention.

FIG. 2 shows an optical carrier selector system 200 according to an embodiment of the present invention, for selecting a wanted carrier signal $f_W$ from a multi-carrier signal comprising a plurality of carrier signals, for example N carrier signals $f_1$-$f_N$. The optical carrier selector system 200 comprises a series (or a cascade) of optical filter devices $OFD_1$-$OFD_{N-1}$. Each optical filter device of the series comprises an input port 201 for receiving a signal comprising two or more carrier signals, each optical filter device being configured to filter out an unwanted carrier signal $f_{UW}$. Each optical filter device comprises an output port 203 (also referred to herein as a "through port") for outputting at least the wanted carrier signal and any remaining signals that have not been filtered out by that particular optical filter device. Each optical filter device comprises a drop port 205 for outputting the unwanted carrier signal $f_{UW}$ that is being filtered out by the respective optical filter device.

As such, each stage of the series, i.e. each optical filter device in the cascade, removes a particular unwanted carrier signal ($f_{UW1}$, $f_{UW2}$, etc), such that the wanted carrier signal fw is output from the final stage of the series. The optical carrier selector system therefore comprises N−1 optical filter devices.

By providing a series of optical filter devices for removing unwanted carrier signals, such an arrangement is suitable for applications where the optical carrier selector system must be re-tuned to select a different carrier signal having a different frequency. Furthermore, by providing a drop port 205 at each optical filter device of the series, this enables the signal being filtered out at each optical filter device to be monitored, such that proper operation of each stage of the series can be monitored, and corrective action taken if needed. For example, an optical power level at the drop port 205 of each optical filter device can be monitored and checked for proper operation, for example following a re-tuning operation, and/or during use to detect drift caused by temperature changes or other factors. Further details will be provided later in the application in relation to how the monitoring and control functions are performed according to various embodiments of the invention.

According to one embodiment, the optical carrier selector system 200 comprises a monitoring device (not shown) coupled to each drop port 205, for monitoring the optical power of the unwanted carrier signal $f_{UW}$ being filtered out by a respective optical filter device OFD.

Each monitoring device can be used, for example, to monitor whether the correct unwanted carrier signal has been filtered out by a respective optical filter device, and/or to control fine tuning of one or more filter characteristics of an optical filter device being used to filter out a particular unwanted carrier signal. For example, a monitoring device can be used to control the centre frequency of a notch filter being used as a band stop optical filter device for removing a particular unwanted carrier signal, and/or the bandwidth of such a notch filter. In some examples, each optical filter device filters out only one spectral component (carrier). The series of the optical filter devices filters out all except one of the source plurality of wavelengths.

It is noted that the centre frequency (and other filter characteristics, if desired) can be controlled to fine tune the operation of an optical filter device. The fine tuning is based on the monitoring of the unwanted carrier signal, e.g. adjusting the filter frequency to maximise the power of the unwanted carrier signal. By enabling the optical filter devices to be monitored and controlled in this way, the performance of the overall series of optical filter devices can be improved, such that a wanted carrier signal can be selected more accurately. In some examples, the fine tuning is by monitoring at the drop port a change over time an indication of the power level of the optical component at the drop port. The filter frequency of the optical filter device can then be adjusted to correct (i.e. reverse) this change over time. The correction may compensate for heating from adjacent optical filter devices. Alternatively or in addition, the fine tuning comprises a controlled variation or scanning of the filter frequency of the optical filter device in order to identify the optimal frequency, i.e. at which the power level indicated by monitoring at the drop port is a maximum.

In some examples, a monitoring device is coupled to the output port of the optical filter device in the final stage of the series of optical filter devices, for monitoring the optical power of the wanted carrier signal fw. In one embodiment such a monitoring device is provided in addition to the one or more monitoring devices coupled to drop ports 205 of the optical filter devices. According to another embodiment, such a monitoring device is provided or used alone, as a means of determining whether the wanted carrier signal has been selected correctly.

A monitoring device may be configured to detect the optical power level of the unwanted carrier signal being filtered out at a respective optical filter stage, and/or the optical power level of the wanted carrier signal fw at the output port of the optical filter device in the final stage of the series of optical filter devices. In some examples, the monitoring device is a photodiode.

The embodiments described herein can be used, for example, to select a carrier signal from a super-channel of an optical network infrastructure, the super-channel comprising multiple carriers. The embodiments described herein are also suitable for use in applications where frequencies of the carrier signals, and/or frequency spacings of the carrier signals are tunable on a flexible grid.

Figure 3:
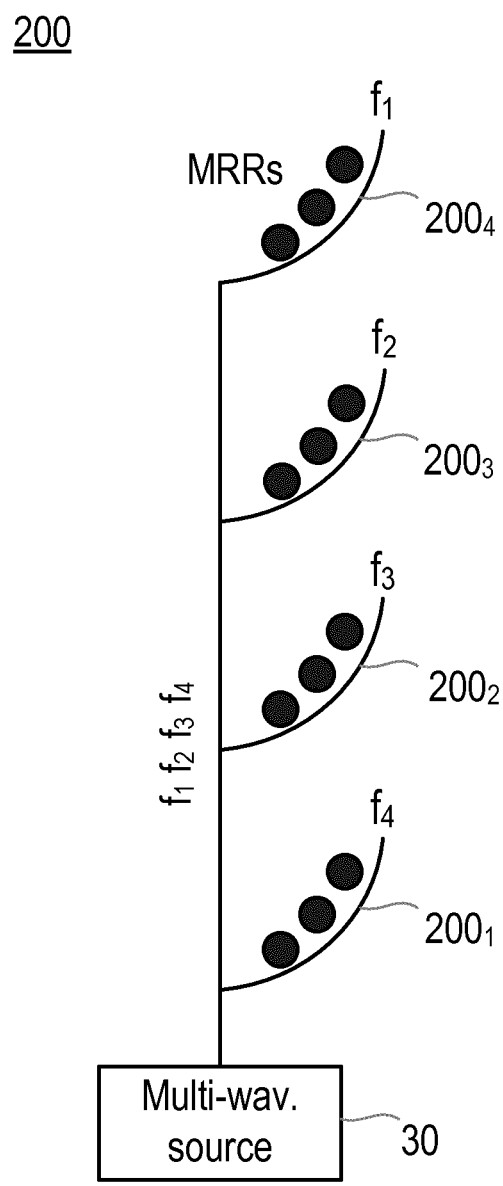
FIG. 3 shows an example of how an optical carrier selector system according to an embodiment of the invention can be used to select multiple optical carrier signals.

FIG. 3 shows how different carrier signals can be selected from a multi-wavelength source 30, for example where an optical carrier selector system 200 of the type shown in FIG. 2 comprises a plurality of series of optical filter devices. Each black dot indicates an optical filter device, and each series of optical filter devices is represented as a series of black dots. In some examples, a system according to the present invention comprises the multi-wavelength source 30 or a port configured to receive the multi-wavelength source 30. In some examples, the source 30 is common for all the plurality of series of optical filter devices.

Each series of optical filter devices in the optical carrier selector system 200 is configured to select a single carrier signal and then, for example, direct the selected carrier signal for carrier modulation (not shown). In the example of FIG. 3 the multi-wavelength source outputs a multi-carrier signal comprising four carrier signals f1 to f4 (i.e. N=4). A first series or stage $200_1$ of the optical carrier selector system 200 comprises three (i.e. N−1) optical filter devices, and in the example the first stage $200_1$ is configured to output the carrier signal having frequency f4. Therefore, the optical filter devices in the series within the first stage $200_1$ of the optical carrier selector system 200 are configured to filter out or suppress carrier signals having frequencies f3, f2 and f1.

Likewise, a second series or stage $200_2$ of the optical carrier selector system 200 comprises three (i.e. N−1) optical filter devices, and in the example the second stage $200_2$ is configured to output the carrier signal having frequency f3 (and hence filter out or suppress carrier signals having frequencies f4, f2 and f1). A third series or stage $200_3$ is configured to output the carrier signal having frequency f2 (and hence filter out or suppress carrier signals having frequencies f4, f3 and f1), and a fourth stage $200_4$ is configured to output the carrier signal having frequency f1 (and hence filter out or suppress carrier signals having frequencies f4, f3 and f2).

It is noted that each optical carrier selector system 200 can comprise any number of optical filter devices within each stage, depending upon how many carrier signals are contained in the multi-carrier source 30. Likewise, any number of stages (i.e. series) can be provided in a system, depending upon how many of the carrier signals present in the multi-carrier source are required by a particular application or user.

According to one embodiment, the optical filter devices (OFDs) used in an optical carrier selector system can be realized using micro ring resonators (MRRs). Each MRR is configured to filter out or suppress a particular unwanted carrier signal from a multi-wavelength source. Each MRR can be used in a band-rejection mode to suppress a particular unwanted carrier signal.

Figure 4A:
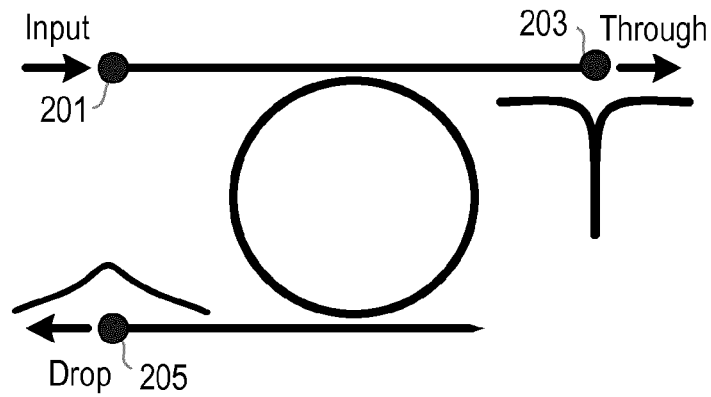
FIG. 4a shows an example of a micro ring resonator (MRR) for use with an embodiment of the invention.

FIG. 4a provides a schematic illustration of an MRR optical filter device. An input port 201 of the MRR optical filter device is coupled to receive a multi-carrier signal. In other words, the input port 201 will receive a signal comprising two or more carrier signals, at least one of which is the wanted carrier signal. The MRR operates as a multi-port device in which the optical signal entering the input port 201 is suppressed at its first output port 203 (the "through port"), with the suppressed or filtered out signal being made available at a second output port 205 (the drop port). As a result, the first output port or through port 203 passes the wanted carrier signal (and any other carrier signals that have not been filtered out by that optical filter device or any preceding optical filter devices), while the drop port 205 at each stage outputs the unwanted signal that is being suppressed or filtered out at that MRR. It is noted that is some examples the drop port may be tapered, as shown in FIG. 4a. The tapering can be provided to reduce spurious reflections occurring when there is spurious light diffused or unexpected coupled light.

Figure 4B:
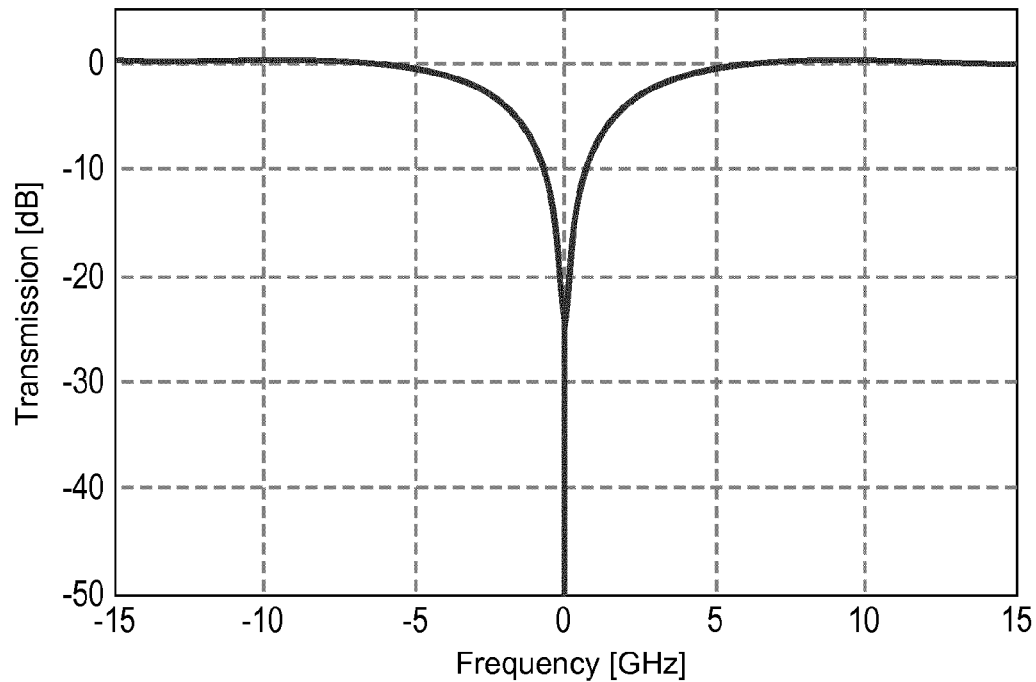

MRRs can be used in band-rejection mode to provide very fine bandwidth filtering, as shown in FIG. 4b, which can be tuned within the periodic free spectral range (FSR).

Further details about optical filter devices in the form of tunable micro ring resonators, MRRs, will be discussed later in the application, and can also be found in a paper by M. Rasras et al, "Demonstration of a tunable microwave photonic notch filter using low-loss silicon ring resonators," Lightwave Technology Journal, vol. 27, no. 12, pp. 2105 to 2110, 2009.

Figure 5:
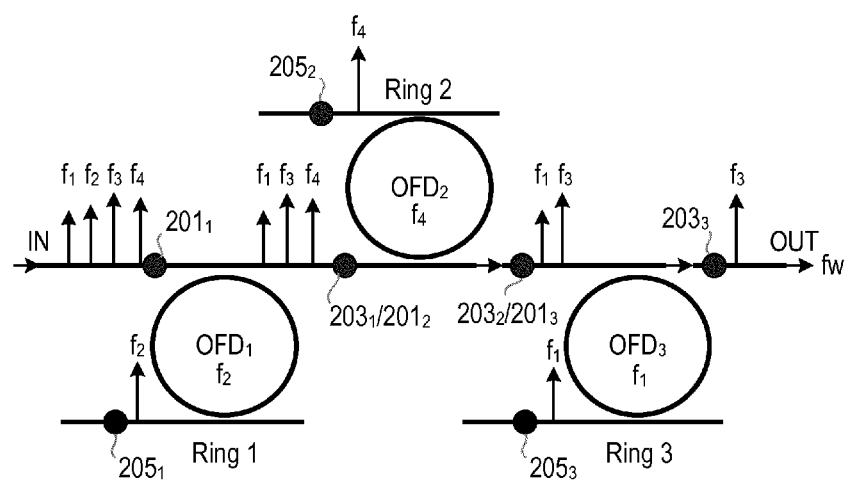
FIG. 5 shows an optical carrier selector system according to another embodiment of the invention.

FIG. 5 shows an example of an optical carrier selector system where four carrier signals (f1-f4, N=4) form a multi-carrier signal, and in which a series of N−1 optical filter devices, $OFD_1$ to $OFD_3$, are realized. The optical filter devices are realized, e.g. using MRRs, for selecting a wanted carrier signal fw. Each optical filter device of the series may function as a notch filter (i.e. band-rejecting filter) to suppress an unwanted (or non-desired) carrier signal, finally leaving only the wanted carrier signal fw at the output. In this way the first MRR ($OFD_1$) receives on an input port $201_1$ a signal comprising four carrier frequencies, f1-f4, one of which is suppressed or filtered out, for example f2. The unwanted carrier signal, f2, is made available at a drop port $205_1$, with the remaining three carrier frequencies f1, f3, f4 passing via the through port $203_1$ to the second MRR ($OFD_2$).

The second MRR ($OFD_2$) receives the three remaining carrier signals f1, f3, f4 on an input port $201_2$, and filters or suppresses a second carrier frequency, for example f4, with the remaining two carrier frequencies f1 and f3 passing via through port $203_2$ to the third MRR ($OFD_3$). A drop port $205_2$ is provided in the second MRR ($OFD_2$) for outputting the unwanted carrier signal, f4, which is being filtered out or suppressed, i.e. removed.

The third MRR ($OFD_3$) filters or suppresses a third carrier frequency, for example f1, such that only the wanted carrier frequency fw (i.e. f3 in the example) remains at the output of the series, via port $203_3$. A drop port $205_3$ is made available at the third MRR ($OFD_3$) for outputting the unwanted carrier signal, f1, which is being filtered out or suppressed, i.e. removed.

Thus, each tunable device comprises the feature of a pass through port enabled for the selected carrier signals (or carrier signal in the case of the final tunable device in the series), and a drop port enabled for the rejected carrier signal. It is noted that different carrier frequencies can be filtered at different MRRs, that is, in a different order. It is also noted that embodiments of the optical carrier selector system may comprise a different number of MRRs if a different number of carrier signals are present in the multi-carrier source. Furthermore, although the examples are described using MRRs, embodiments of the invention may comprise any optical filtering device having these two characteristics.

It is noted that the series of optical filter devices may be provided on a common integrated circuit, for example an integrated circuit known as a Photonic Integrated Circuit (PIC). It is also noted that such a common integrated circuit may also include a modulator, for modulating the selected carrier signal. Alternatively, the common integrated circuit may include a module for receiving a pluggable modulator.

Furthermore, it is noted that a common integrated circuit, such as a PIC, may comprise one or more stages of an optical carrier selector system, each stage having a respective series of optical filter devices. Such a common integrated circuit may also comprise one or more integrated modulators, for modulating selected carrier signals, or one or more modules for receiving such modulators. In such an embodiment, for example, an integrated circuit could be configured to select multiple carrier signals (for example four), but a particular network operator may only wish to utilize some of these (for example two). In such an example the common integrated circuit could receive two pluggable modulators to perform the required application. Then, if more carrier signals need to be used at a later date, for example if network bandwidth needs to be increased, then the common integrated circuit can be adapted to receive three or four pluggable modulators. This type of modular arrangement enables cost effective solutions to be provided.

In some examples a common integrated circuit, such as a PIC, also comprises a controller for controlling one or more stages of an optical carrier selector system.

In some examples a common integrated circuit, such as a PIC, also comprises a multi-wavelength source which generates the multi-carrier signal.

It is noted that a common integrated circuit may comprise any number or any combination of these features.

According to another aspect of the present invention, a controller is provided for managing the system while MRR settings are being tuned, or in response to fluctuations from a preferred mode of operation which are detected during use. For example, the resonance of an MRR can be changed to be in agreement with multi-wavelength source tuning, for instance in an optical network infrastructure which operates as a flexible grid. As such, the MRRs can be monitored and controlled in order to ensure that at each tuning procedure the selection of the wavelengths is performed properly.

Figure 6:
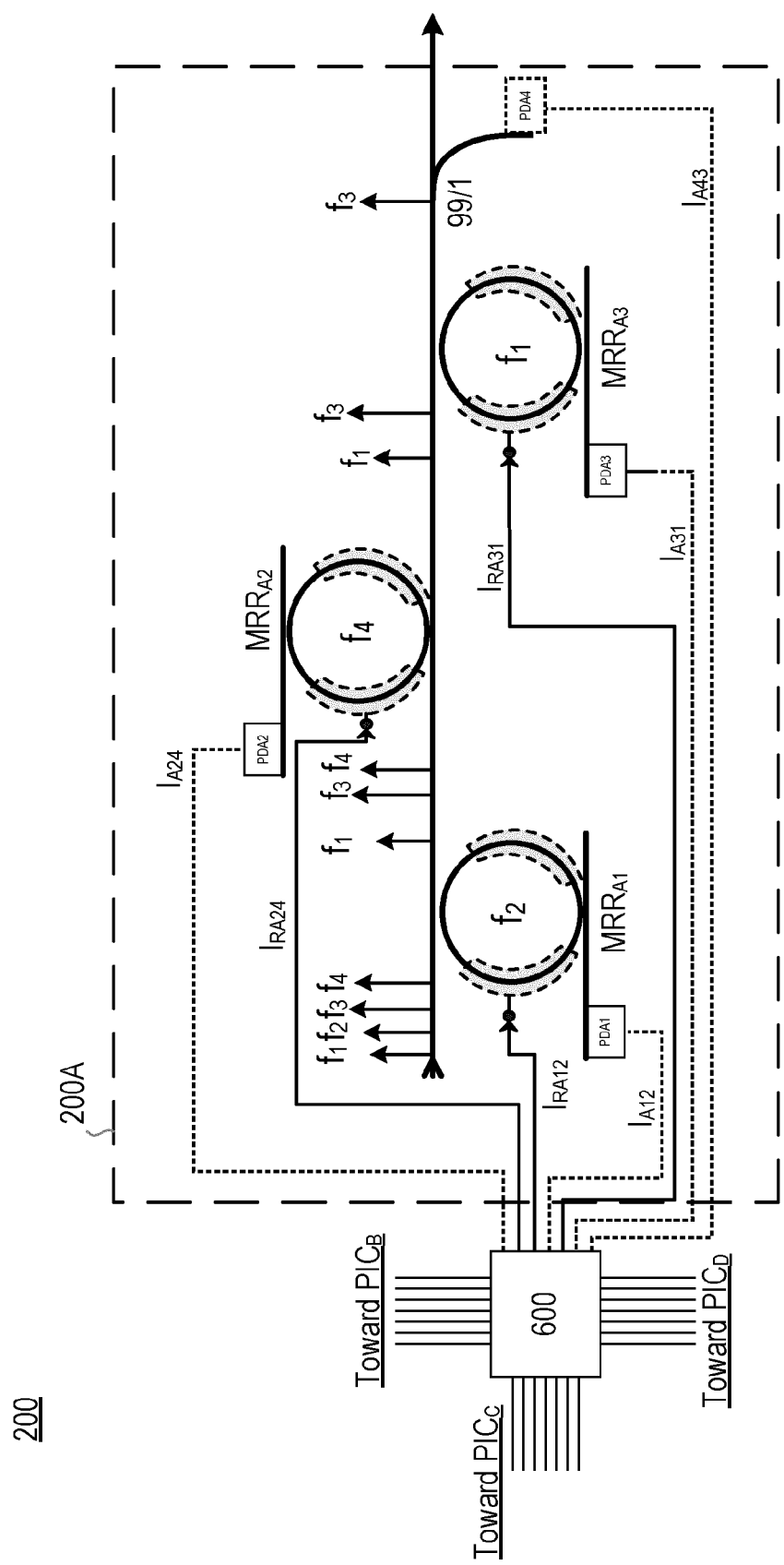
FIG. 6 shows a further embodiment of the present invention.

FIG. 6 shows further details of an optical carrier selector system 200 according to another embodiment of the present invention, comprising a controller 600 for controlling, for example, four series or stages 200A-200D of the optical carrier selector system 200. For ease of reference only one such stage 200A of the optical carrier selector system 200 is shown. As noted above, the controller 600 may be provided as a separate entity to each of the one or more stages of the optical carrier selector system 200. Alternatively, the controller 600 may form a common integrated part with one or more stages of the optical carrier selector system 200 (or any modulators associated with a stage of the optical carrier selector system).

In the example of FIG. 6 the optical carrier selector system 200 comprises stages of the type shown in FIG. 5, in which each stage of the optical carrier selector system 200 comprises a series of MRRs. It is noted, however, that the controller of FIG. 6 can be used with stages comprising other types of optical filter devices, provided that each optical filter device comprises a through port and a drop port as mentioned above. It is also noted that the controller 600 can be configured to control a different number of stages in the optical carrier selector system 200, depending on the number of carrier signals to be selected, or the number of carrier signals forming the multi-carrier signal.

Each stage of the optical carrier selector system 200 flexibly selects a particular carrier signal, for example from a multi-carrier signal in the form of a wavelength division multiplexing (WDM) comb, by tuning the resonant frequency of the MRRs, exploiting a thermo-optic effect (described later in the application). In order to optimize the tuning of the notch filters at each change of selected wavelength, and/or to stabilize it against temperature variations or other parameters which affect operation during use, the optical carrier selector system is provided with monitoring and control circuitry.

For example, each drop port of a respective optical filter device $OFD_1$-$OFD_3$ comprises a monitoring device, shown as PD1, PD2 and PD3, respectively. The monitoring devices PD1, PD2 and PD3 provide information about the correct operation or filtering performance of each MRR by detecting, at each drop port, the frequencies being rejected or filtered out by a respective MRR.

The monitoring devices PD1, PD2 and PD3 may be realized, for example, using photodiodes. The photo-detected signal at each drop port is a measure of the optical power which is suppressed at the through port at the unwanted frequency. In other words, the optical power detected at the drop port corresponds to a measure of by how much the optical power at the through port will have dropped because of the unwanted signal being suppressed or filtered out.

The optical power level monitored at a drop port can then be used by the controller 600 to control the operation of the system, for example by appropriately adjusting the feeding current $I_R$ of heating units, for example metallic heaters, placed above the MRRs. A heating unit enables the central frequency of the relevant MRR filter to be tuned, in order to optimize the rejection of the unwanted frequencies before reaching the output of the series of MRRs.

According to one embodiment, this monitoring and control function performed by the controller 600 can be simplified by comparing the optical power level at each drop port with predefined optical power levels, for example stored in a look-up table. In this way optimization is achieved if the detected optical power levels correspond to the expected ones defined in the prefixed lookup table.

The optical power level may provide a check that the correct frequency has been selected to be output to the drop port. For example, the power level of a spectral component at the drop port is determined, in some examples, before or after optimization by fine tuning to obtain the maximum power level for that spectral component. The power level at the drop port is compared to a stored power level for the correct spectral component. If the power levels are the same, the correct spectral component is at the drop port. If the power levels are different, an incorrect spectral component has been selected for the drop port, i.e. a spectral component at a different frequency. A relatively large correction can be made to the optical filter device to output the intended spectral component to the drop port. In some examples, the incorrect spectral component is identified, in order to re-tune the optical filter device to filter out the correct spectral component. In some examples, the power level of each spectral component entering a series of filter devices is different.

As well as performing such monitoring and control operations in response to retuning procedures, it is noted that the frequency of each filter can be also stabilized against unpredictable temperature fluctuations (e.g. uncontrolled thermal crosstalk among adjacent or close MRR heaters) depending on the detected optical power variations. The driving currents generated to compensate for these fluctuations can be checked and set by the controller 600.

The optical power detected at a drop port 205 can be adjusted through the central frequency tuning of the filter, i.e. MRR. The carrier rejection can be optimized on the drop port 205 if the detected optical power corresponds to the expected one in the prefixed lookup table (optionally with the power level at the drop port optimized to a maximum power level with variations in frequency for fine tuning).

The arrangement shown in FIG. 6 allows the monitoring and control circuitry to ensure proper system operability even in the case of a rearrangement in the assigned frequency for an optical carrier selector (or selectors), which requires a change in the crucial settings of the overall device. The real time monitoring and control provided by embodiments of the invention ensures rapid and robust operation.

In order to achieve robustness against central frequency misalignment and temperature variations, the resonant frequency of each MRR can be set to the desired value by properly tuning the temperature of the relevant driving heater units (the heaters shown by dotted lines on each MRR). The temperature of the heater unit is determined by setting a certain value of the current $I_R$ flowing through the heater contacts.

During fabrication of a MRR, the current $I_R$ can be determined as part of a calibration process. The tuning of the central frequency of the MRR can be obtained by making reference to a predefined look-up table which stores the proper driving current $I_R$ corresponding to a different working MRR temperature (T). In the optical carrier selector systems shown in the examples of FIGS. 5 and 6, each MRR has its look-up table of reference where the driving currents $I_{Rx,h,k}$ are indicated, where "Rx" relates to a particular stage of the optical carrier selector system (i.e. a particular series of optical filter devices), "h" relates to the number of the MRR in the path towards the output of the series, for example towards a modulator which modulates the selected carrier signal, and "k" relates to the frequency number in the multi-wavelength source comb. It is noted that both subscript h and k are integer numbers and if N is the number of carriers for the super channel, $0<k\leq N$ and $0<h<N$. It is noted that the modulator mentioned above may either be provided on a separate Photonic Integrated Circuit $PIC_{x=A,B,C,D}$ to be driven, or form part of the same $PIC_{x=A,B,C,D}$ as a corresponding stage of the optical carrier selector system).

Such a look-up table can be defined for the example shown in FIG. 6, as illustrated below in Table 1 where $MRR_{xh}$ is the $h^{th}$ MRR in the path toward $PIC_X$.

TABLE 1

| Dropped frequency in the path toward $PIC_{x=A, B, C, D}$ | $MRR_{x1}$ | $MRR_{x2}$ | $MRR_{x3}$ |
| --- | --- | --- | --- |
| $f_1$ | $I_{Rx11}$ | $I_{Rx21}$ | $I_{Rx31}$ |

TABLE 1-continued

| Dropped frequency in the path toward $PIC_{x=A, B, C, D}$ | $MRR_{x1}$ | $MRR_{x2}$ | $MRR_{x3}$ |
| --- | --- | --- | --- |
| $f_2$ | $I_{Rx12}$ | $I_{Rx22}$ | $I_{Rx32}$ |
| $f_3$ | $I_{Rx13}$ | $I_{Rx23}$ | $I_{Rx33}$ |
| $f_4$ | $I_{Rx14}$ | $I_{Rx24}$ | $I_{Rx34}$ |

Table 1 shows an example of a predefined lookup table, illustrating the current value settings $I_R$ required for each micro ring resonator to drop the unwanted frequencies toward the PICx As mentioned above, $I_{Rxhk}$ denotes the current required to drive the heaters of the $h^{th}$ MRR in the optical path toward $PIC_X$, in order to set the resonance on the $k^{th}$ frequency of the multi-wavelength source comb.

Therefore, the controller 600 of FIG. 6 may be configured to tune each stage of the optical carrier selector system 200 by selecting a drive current $I_R$ for each MRR, according to which unwanted frequency is to be filtered out at which MRR in the series.

Furthermore, the controller 600 of FIG. 6 may be configured to monitor or detect, using the photodiodes PD located on the related drop ports, the optical power of the continuous wave corresponding to the unwanted carrier signals. The photodiodes generate a monitored current value $I_{xlk}$ (where "l" corresponds to the $l^{th}$ monitoring photodiode and $0<l\leq N$) which is representative of the optical power at a particular drop port of an MRR, and "k" the frequency of the carrier signal being filtered out by the MRR corresponding to that photodiode PD. The monitored current value $I_{xlk}$ can be measured and analysed by the controller 600.

TABLE 2a

| Pass through frequency in the path toward $PIC_{x=A, B, C, D}$ | $PD_{x1}$ | $PD_{x2}$ | $PD_{x3}$ |
| --- | --- | --- | --- |
| $f_1$ | $I_{x12}$ | $I_{x23}$ | $I_{x34}$ |
| $f_2$ | $I_{x11}$ | $I_{x23}$ | $I_{x34}$ |
| $f_3$ | $I_{x12}$ | $I_{x24}$ | $I_{x31}$ |
| $f_4$ | $I_{x11}$ | $I_{x22}$ | $I_{x33}$ |

Table 2a shows an example of a second look-up table containing the expected current values for each photodiode in the optical carrier selector system of FIG. 6.

Since FIG. 6 shows the stage 200A relating to the stage which passes through (or selects) a carrier signal having frequency f3, this corresponds to the third row in Table 2a above. Therefore, the current expected from the drop port of the first MRR is the series, i.e. $MRR_{A1}$, is $I_{A12}$ (corresponding to the entry in the third row, first column in Table 2a above), while the current expected from the drop port of the second MRR in the series, $MRR_{A2}$, is $I_{A24}$ (corresponding to the entry in the third row, second column in Table 2a above), while the current expected from the drop port of the third MRR in the series, i.e. $MRR_{A3}$, is $I_{A31}$ (corresponding to the entry in the third row, third column in Table 2a above).

Therefore, if the cascaded filter tuning is performed correctly the optical power detected by photodiodes PD1, PD2, and PD3 will each correspond to the expected ones in the second predefined look-up table of Table 2a.

If all of the current values $I_{xlk}$ are set sufficiently different among each other, at least for a fixed x (i.e. a particular stage of an optical carrier selector system 200), with respect to the resolution of the current detection process, each unwanted carrier signal (dropped frequency) can be associated to a particular current value. Examples of the invention are therefore arranged such that each frequency (carrier signal) is associated with a different generated optical power.

This difference can be ensured by the non-ideal equalization in terms of optical power of the spectral components in the multi-wavelength source comb, i.e. each carrier signal of a multi-carrier signal having a different power level. Consequently the difference in optical power at a particular monitored drop port can be used to unambiguously determine the dropped frequency (i.e. unwanted carrier signal), and a reliable lookup table can be determined. Further details of using and creating a difference in optical power of the frequencies for an optical power selector are described below.

To precisely detect the different current values from the photodiodes, according to one embodiment a current threshold analyser can be used. Different thresholds can correspond to different current values obtainable by a photodiode's light detection. Each time this threshold is reached, the dropped frequency is determined by consulting the lookup table, for example as shown in Table 2a. In this case the resolution is determined by the minimum threshold difference that can be revealed by the exploited threshold analyser. It is assumed that the multi-wavelength source is sufficiently stable in terms of emitted light power per each frequency (carrier). In an application where this is not the case, the maximum fluctuation around the mean optical power value determines the minimum difference between thresholds in the threshold analyser in order to avoid decision errors. It is noted that the threshold analyser can be embedded in the controller 600.

The controller 600 can be configured to prevent mutual operative interference of adjacent MRR controllers. For example, if MRRs are thermally controlled by means of heating elements, a single heating element may influence the resonance of the adjacent MRRs (and the performance of the related heating element as well), thereby making it unable to detect whether or not proper selectivity is performed or not by the system.

The embodiments of the invention avoid this, by providing a functional monitoring system compatible with the low level of cost, power consumption and footprint of MRRs.

The embodiments of the invention have advantages over other techniques, for example if the monitoring of the correct selected wavelength, at each flexible change of setting parameters in the device, were achieved through the use of a costly and power hungry wavelength meter at each MRR. Alternatively, a different slow modulation (kHz bandwidth) could be superimposed to each wavelength of the super-channel comb. However, in the case of exploitation of a multi-wavelength source generated by a single light source, such a technique would not be suitable since the comb generator is the same for every spectral component, which cannot be modulated separately in order to be unambiguously identified.

As mentioned above the embodiment of FIG. 6 can therefore integrate, in a single controller system, the functions of checking the correct carrier selection, while allowing critical filtering conditions to be optimized (e.g. central frequency, filter shape, free spectral range coupling), and while also achieving stabilization against transients due to the tuning of critical parameters of the dense carrier selector (i.e. driving currents or voltages for carrier selection performance).

Embodiments of the invention also have the advantage of achieving stabilization against temperature deviation effects (i.e. central frequency detuning and/or filter shape variation in higher order filters).

In the embodiment described above in FIG. 6, the correct operation of the optical selector device 200 is determined by monitoring the power levels at the drop ports of the MRRs, for example using photodiodes PD1, PD2 and PD3.

According to another embodiment, the controller 600 of FIG. 6 can be further configured to monitor and control the operation of one or more stages of an optical carrier selector system 200 by also monitoring the optical power of the selected (wanted) frequency, as well as monitoring the optical power of the rejected or unwanted frequencies. This additional monitoring can be carried out through a photodiode PD4 (shown in dotted lines in FIG. 6), for example, coupled to the output port (through port) of the MRR in the final stage of the series. Thus, the controller 600 is adapted to control and optimize the system performance taking into account the information from the monitoring device PD4, as well as the information from the monitoring devices PD1, PD2 and PD3. In some examples, the controller can be configured to only monitor the optical power level of the selected carrier signal during certain modes of operation, for example when monitoring for drift during normal operation.

Thus, according to this embodiment, to enhance the precision of the monitoring and control function of the filtering performance, a further monitoring device, such as a photodiode PD4, is coupled at the output port toward $PIC_x$ to detect a portion of optical power of the passing through frequency. As such, this photodiode PD4 monitors the power level of the output of the final optical filter device, corresponding to the wanted carrier signal. Even for this photodiode PD4 a different generated current can be associated to a different frequency (carrier signal), if generated in a non-equalized multi-wavelength source.

Therefore, for such an embodiment, in the controller 600 of FIG. 6 is further configured to monitor the optical power level of the wanted carrier signal being output from the respective optical carrier selector, and compare the monitored optical power level of the wanted carrier signal with a predetermined power level in a look-up table. The controller 600 may be further configured to control the operation of a respective stage of the optical carrier selector system 200 based on the optical power levels monitored at the drop port of each optical filter device and the optical power level of the wanted carrier signal.

Table 2b shows an example of a predefined third lookup table which can be used to additionally compare the current of this photodiode PD4 with predetermined current values.

TABLE 2b

| Pass through frequency in the path toward $PIC_{x-A, B, C, D}$ | $PD_{x1}$ | $PD_{x2}$ | $PD_{x3}$ | $PD_{x4}$ |
|---|---|---|---|---|
| $f_1$ | $I_{x12}$ | $I_{x23}$ | $I_{x34}$ | $I_{x41}$ |
| $f_2$ | $I_{x11}$ | $I_{x23}$ | $I_{x34}$ | $I_{x42}$ |
| $f_3$ | $I_{x12}$ | $I_{x24}$ | $I_{x31}$ | $I_{x43}$ |
| $f_4$ | $I_{x11}$ | $I_{x22}$ | $I_{x33}$ | $I_{x44}$ |

Table 2b shows the current value $I_{xlk}$ measured at each ring resonator drop port and output pass-through port toward PICx by a photodiode PDxn where $0 < n \leq N$, (where "l" corresponds to the $l^{th}$ monitoring photodiode), and "k" the frequency of the carrier signal being filtered out by the MRR corresponding to that photodiode PD. The monitored current value $I_{xlk}$ can be measured and analyzed by the controller 600.

Therefore, if the cascaded filter tuning is performed correctly the optical power detected by photodiode PD4 corresponds to the expected one in the third look-up table.

This can be used alone to monitor if a particular stage of an optical carrier selector system is operating correctly, or used in conjunction with one or more of the other photodiode PD1, PD2 or PD3 to check for proper operation of the optical carrier selector system.

It can be seen from the above that the third look-up table comprises, for each carrier frequency of the multi-carrier signal, a set of current values corresponding to the drop port of each optical filter device in a series of an optical carrier selector, and a current value corresponding to an output port of the final optical filter device of the series.

It is noted that in the examples of Tables 2a and 2b, it is assumed that the optical filter devices are arranged in their respective series' to filter out the unwanted carrier signals in a particular order. For example, in row 1 of Tables 2a and 2b, corresponding to where f1 is the desired wanted signal (pass through frequency), frequency f2 is filtered out at the first MRR in the series, frequency f3 filtered out at the second MRR in the series, and frequency f4 filtered out at the third MRR in the series. This is reflected by the current values of Ix12, Ix23, Ix34 for the respective photodiodes PDx1, PDx2 and PDx3. This corresponds to what might be considered a "normal" order, i.e. whereby the unwanted carrier signals are filtered out in ascending order of frequency.

However, as will be described below, the unwanted carrier signals may be filtered out in a different order, if desired. For example Tables 2a and 2b show that the carrier signal having a frequency f3 is selected by first filtering out the unwanted carrier signal having frequency f2, then filtering out the unwanted carrier signal having frequency f4, and then filtering out the unwanted carrier signal having frequency f1. As such, the third row of tables 2a and 2b contain current values Ix12, Ix24, Ix31 (relating to the order of removal being f2 then f4 then f1).

This is reflected in FIG. 6, whereby the first optical filter device in the series, $MRR_{A1}$, is configured to suppress or filter out a carrier signal having a frequency $f_2$. The second optical filter device in the series, $MRR_{A2}$, is configured to suppress or filter out a carrier signal having a frequency $f_4$. The third optical filter device in the series, $MRR_{A3}$, is configured to suppress or filter out a carrier signal having a frequency $f_1$. As a result, the through port (i.e. output port) of the third optical filter device outputs the wanted carrier signal having a frequency $f_3$.

If the wanted carrier signal f3 were obtained by filtering out the unwanted carrier signals in a different order, for example f1 followed by f2 followed by f4, then the third row of Tables 2a and 2b would contain the current values Ix11, Ix22, Ix34.

It is noted that Tables 2a and 2b could also be configured to contain multiple different rows for each particular pass through frequency, representing different orders in which the unwanted carrier signals can be removed.

It is therefore noted that the unwanted carrier frequencies can be filtered out or suppressed by the optical filter devices of each stage of an optical carrier selector system 200 in any order. However, according to one embodiment the optical filter devices are arranged in their respective series' such that adjacent optical filter devices remove carrier signals having non-adjacent frequencies, as reflected in the embodiment of FIG. 6 (whereby $f_3$ is the frequency of the wanted carrier signal, with carrier signals having frequencies $f_2$ and $f_4$, or vice versa, being removed in the first and second stages of the series of the optical filter device $200_A$, followed by carrier frequency $f_1$ being filtered out by the third optical filter device $MRR_{A3}$). As such, the frequencies being filtered out by adjacent MRRs are themselves non-adjacent.

By arranging the optical filter devices such that they filter out non adjacent frequencies, this has the advantage that less interference is caused by the heating elements of each MRR.

Any deviation from the values defined in the cited lookup tables means that counteractions can be put in place by the controller 600. The possible actions are implemented by setting properly or adjusting the parameters for filter tuning (e.g. driving or voltage currents).

It is noted that, if desired, further monitoring devices can be placed to detect the outputs of the other MRR devices upstream of the final MRR, with corresponding lookup tables to check their proper operation.

As illustrated in FIG. 6, the carrier selected by a specific stage 200A of the optical carrier selector system 200 can be modulated by specific data traffic by means, for example, of a modulator, either on a separate PIC or the same PIC as the optical carrier selector system.

From the embodiments above it can be seen that a controller 600 according to an embodiment of the invention can be configured to selectively control which carrier signal frequency is to be filtered out at each optical filter device in a series.

In examples where each optical filter device comprises a micro ring resonator, MRR, the controller 600 is configured to control the operation of a MRR by controlling the drive current of a heating element associated with the MRR.

The controller 600 may be further configured to control the operation of each MRR in a series based on a set of current values $I_{Rx,h,k}$ stored in a first look-up table, each current value representing a current for driving a heating element of a respective MRR, where "Rx" represents a particular series of MRRs, where "h" represents the number of the MRR in a path towards the output of the series, and "k" represents a frequency of a carrier signal which is to be filtered out by a MRR.

The controller 600 may be further configured to monitor the optical power level received from a drop port (PD) of an optical filter device (OFD), and check for proper operation of the optical filter device by comparing a monitored current value $I_{xlk}$ with a set of predetermined current values stored in a second look-up table, where "X" represents a particular series of MRRs, where "l" represents the number of the MRR in a path towards the output of the series, and "k" represents a frequency of a carrier signal which is to be filtered out by a MRR.

The controller 600 may be further configured to monitor the optical power level of the wanted carrier signal being output from the final optical filter device of a series, and check for proper operation of the series of optical filter devices by comparing the optical power level of the wanted carrier signal with a predetermined optical power level.

The controller 600 may be further configured to fine tune the operation of an optical filter device, by adjusting a nominal current value $I_{Rx,h,k}$ for driving a MRR based on the difference between a monitored current value and an expected current value from the look-up table.

Figure 7:
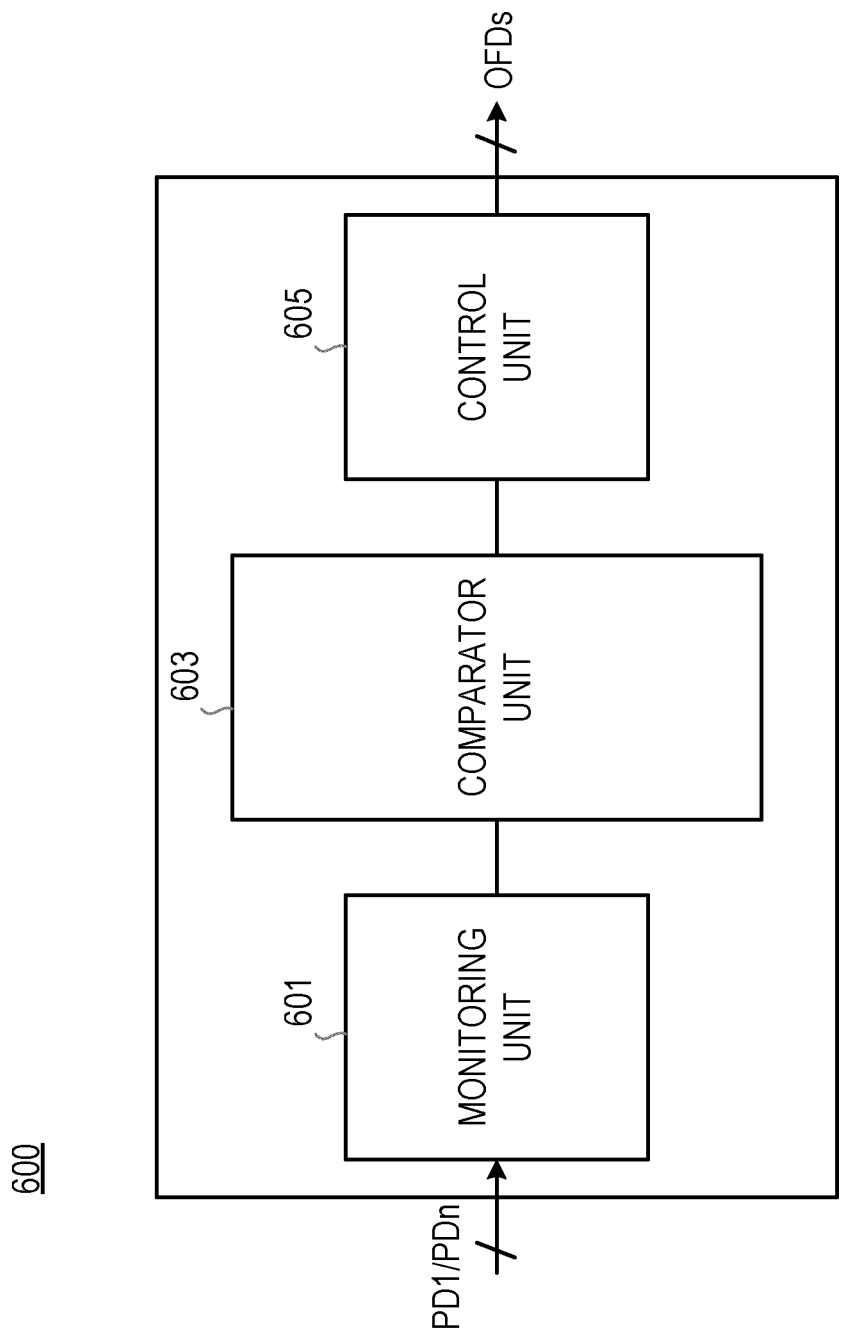
FIG. 7 shows a controller according to another aspect of the present invention.

FIG. 7 shows an example of a schematic diagram of a controller 600 according to another aspect of the present invention, for controlling the operation of one or more stages of an optical carrier selector system (wherein each stage of the optical carrier selector system is configured to select a wanted carrier signal $f_W$ from a multi-carrier signal comprising multiple carrier signals). The controller 600 comprises a monitoring unit 601 configured to monitor the optical power level received from a drop port (PD) of an optical filter device (OFD) associated with an optical carrier selector system. The controller 600 comprises a comparator unit 603 configured to compare the monitored optical power level with a predetermined optical power level value. A control unit 603 is configured to control the operation of the optical filter device based on the result of the comparison.

Figure 8:
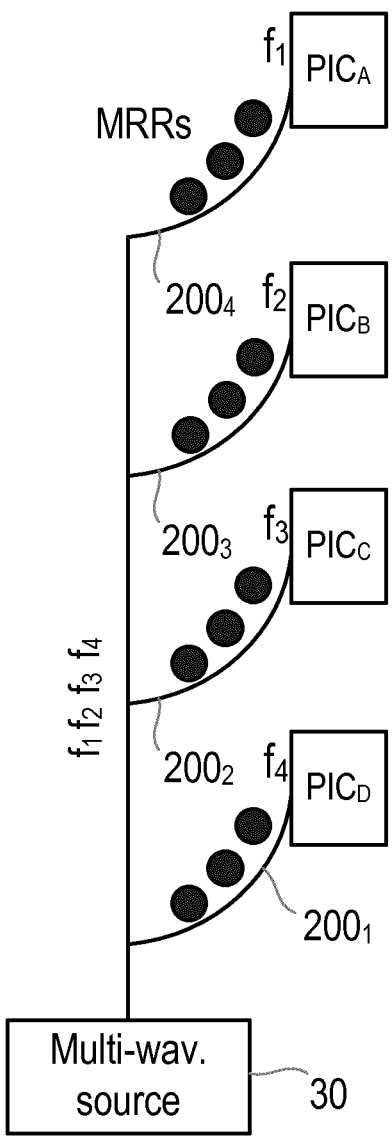
FIG. 8 shows an example of how an optical carrier selector system according to an embodiment of the invention can be used to select multiple optical carrier signals, for use with Photonic Integrated Circuits (PICs)

FIG. 8 is similar to FIG. 3, and shows how the output of each stage of an optical carrier selector system (stages $200_1$ to $200_4$ in an example having four selected carrier signal) can be connected to a PIC ($PIC_A$ to $PIC_A$, respectively), when operating with a multi-wavelength source 30.

As only power differences with respect to expected values have to be monitored, no digital signal processing is required, and as such the controller 600 can be implemented as a simple microprocessor which is sufficient to drive the proper control and monitoring procedure, and adjust and optimize carrier selection.

According to another embodiment, in order to optimize filtering performance, one method for tuning the pass-through frequency towards a $PIC_x$ is to change the resonance only in one MRR. For example, if the pass-through frequency of a particular stage of an optical carrier selector system should be changed from f1 to f2, only the MRR that was dropping f2 should be tuned to f1 in that stage, with the other MRRs remaining unchanged on the same resonances. This policy requires less time to reach a stable regime, and also has the advantage of saving power. According to one example, the controller 600 is configured to re-check the drop port of each MRR, even if only one MRR is having its frequency changed in this manner. According to another example, the monitoring unit is configured to re-check the drop port of each MRR, plus the monitoring point at the selected port (e.g. PD4 in FIG. 6), even if only one MRR is having its frequency changed in this manner.

However, according to another example, only the drop port of the MRR having its frequency being changed is re-checked, or this drop port plus the monitoring point at the selected port (e.g. PD4 in FIG. 6). If the values of optical power obtained are the expected ones from the lookup tables in both cases, then no further action is needed. Otherwise the procedure to realign all MRRs toward the wanted selected carrier may be performed, as described in further detail below in FIG. 9.

If a re-tuning procedure does not converge fast enough towards the proper driving current required for a MRR heater, or if thermal drifts occur, then current variations are revealed by the photodiode(s) being monitored. These are generated by the resulting fluctuations in the optical power of the dropped and passing through frequencies due to the misalignment of MRRs with respect to the set central frequencies. A feedback mechanism producing driving current reduction or increment for the heaters can be generated by the controller 600 evaluating in real-time the currents $I_A$ detected from the photodiode(s), in order to compensate for misalignments of the MRRs.

It is noted that, if the number of carriers with perfect equalization in terms of optical power is greater than two, there might be ambiguity in determining if the proper wavelength is selected at each change of settings in the system, for example after a re-tuning procedure. In this scenario, the output of the multi-wavelength source can be adapted, prior to being processed by the optical carrier selector system, to ensure that non-equalized spectral components are provided, for improving the detection of wavelengths.

Therefore, in an application where a multi-wavelength source is totally equalized or partially equalized, then according to one embodiment an optical filter (e.g. an optical shaping filter) can be used. The optical filter is arranged to introduce spectral imbalance in the spectral components of the multi-carrier signal. The optical filter is configured to provide each spectral component for a particular stage of an optical selector system (i.e. series of optical filter devices) with a different optical power level, so that each carrier signal in the multi-carrier signal (e.g. dense WDM comb) can be unambiguously identified at the monitoring points. Optical equalization of the selected carriers can be performed at the dense carrier selector outputs, if needed.

Therefore according to one embodiment an optical carrier selector further comprises an optical shaping filter adapted to generate imbalance in spectral components of the multi-carrier signal, prior to the multi-carrier signal being received by the series of optical filter devices. The optical shaping filter is configured to provide shaping in the frequency domain, such that each carrier signal (or spectral component) comprises a different optical power level. The optical shaping filter may be considered a disequalizing filter, e.g. arranged to provide non equal power levels to each component of the multi-component signal for each series of optical devices. The optical power level is unique for the wavelength and the particular series of optical filter devices. Different series of optical filter devices may utilise the same power levels.

Figure 9:
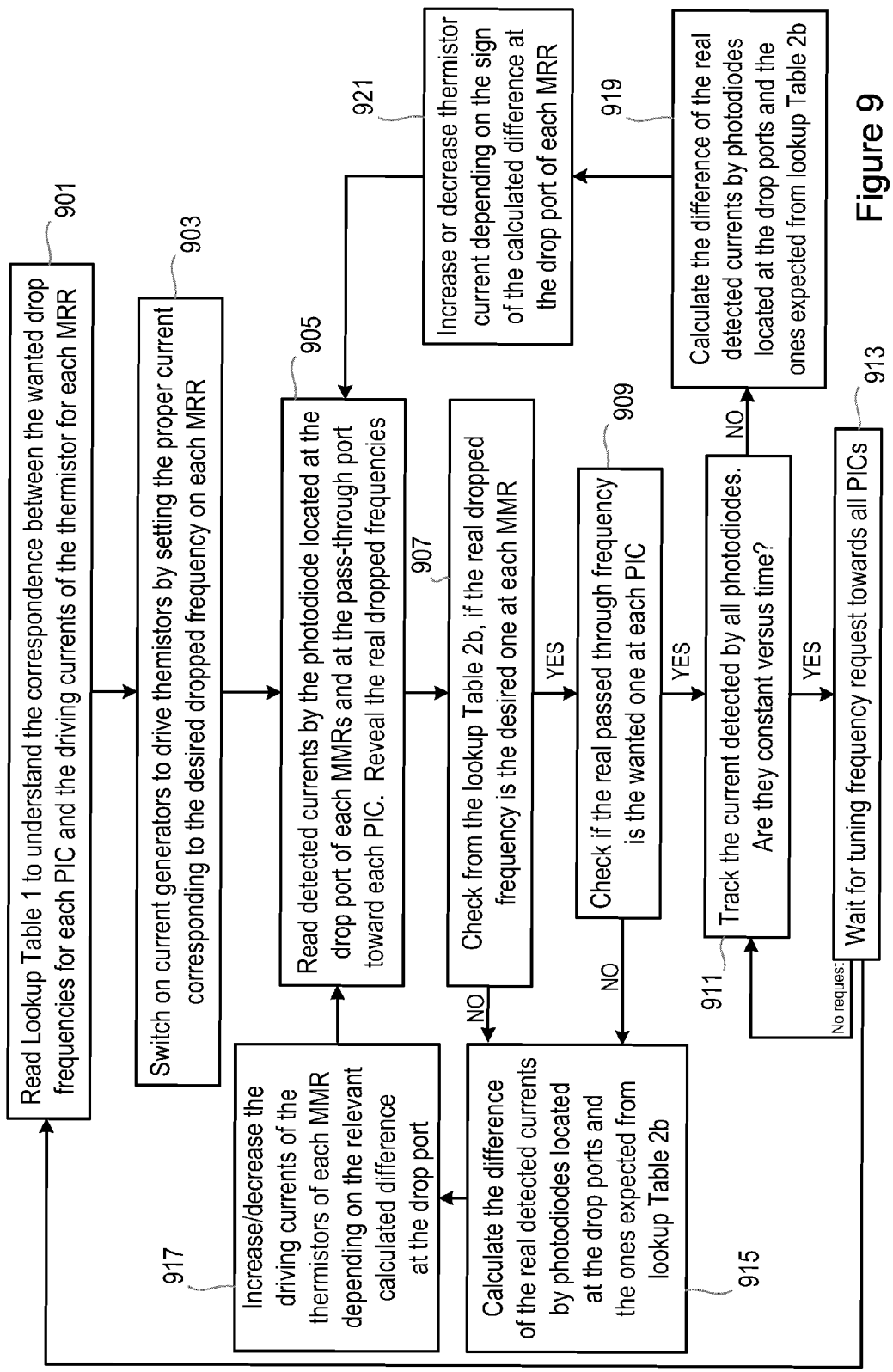
FIG. 9 shows the steps performed by an embodiment of the present invention.

By referencing look-up tables, the steps shown in the flow diagram of FIG. 9 can be carried out to ensure that an optical carrier selector system performs as expected. It is noted that FIG. 9 relates to an embodiment where the optical power level of the wanted signal is monitored, which thus utilizes look-up tables similar to Tables 1 and 2b above.

In step 901 a controller reads a first look-up table, for example Table 1, to understand or determine the correspondence between the wanted drop frequencies for each optical selector device (or PIC), and the driving currents of the thermistor for each MRR. Therefore, in this step, the controller is configured to determine which wanted frequencies are being selected by each optical carrier selector, such that the driving currents for each heating element of each MRR can be determined, such that each MRR of each series removes the correct unwanted frequency, and such that each series of MRRs outputs the desired wanted frequency.

In other words, if optical channel selector 200A associated with $PIC_A$ of FIG. 6 is taken as an example, where f3 is the wanted frequency to be selected, and the series of MRRs configured to filter out frequencies f2, f4, and f1 in that order, then Table 1 is consulted to determine the current required to drive the MRR of each stage of the series. For example, for the first stage of the series, in order to drop frequency f2, Table 1 shows that the relevant current is $I_{RA12}$ (taken from the entry $I_{RX12}$ in the second row under column $MRR_{A1}$).

In step 903 the controller is configured to switch on the current generators to drive the thermistors, by setting the proper current corresponding to the desired dropped frequency of each MRR, i.e. the frequency to be filtered out by each MRR, as determined above in step 901.

The currents detected by a photodiode located at the drop port of each MRR are then detected and read, to reveal the real dropped frequencies, step 905. In other words, this involves detecting a feedback signal to determine if the monitored current levels match the expected current levels. This step may also involve detecting the current from a photodiode at the pass-though port, or output port, of the final MRR in a series of MRRs, i.e. relating to the wanted carrier signal for a particular PIC. This effectively reveals the frequencies being dropped by each MRR, and the one being passed through or selected.

In step 907 the controller is configured to check a second look-up table, for example as shown in Table 2b, to determine if the real dropped frequency is the desired one at each MRR. As such, this step determines whether each MRR has filtered the correct unwanted carrier signal. For example, in FIG. 6 the optical channel selector 200A is configured to pass or select frequency f3. Table 2b is then consulted for the row corresponding to a pass through frequency in the path towards $PIC_A$, i.e. the third row from top corresponding to frequency f3. This row contains the expected current values for each photodiode PD1, PD2, PD3 along the drop ports of the series of MRRs (and the photodiode PD4 at the output).

If it is determined in step 907 that the feedback values do not match the values expected in Table 2b, the controller can be configured, step 915, to calculate the difference between the detected real currents, i.e. from the feedback signals from the photodiodes at the respective drop ports of each MRR, with the ones expected from the second look-up table, e.g. Table 2b.

The controller can then be configured to increase or decrease the driving currents of the thermistors (heating elements) of each MRR, depending on the relevant calculated difference at the drop port of an MRR, step 917, thereby fine tuning the operation of each MRR. In other words, rather than driving each heating element with a nominal current value $I_{RX,h,k}$ taken from Table 1, this nominal current value is increased or decreased, depending on the difference detected by the respective photodiodes.

Steps 905 and 907 can then be repeated, thereby tuning each MRR further, until the currents read from each photodiode match the expected current values from Table 2b.

According to one embodiment the various MRRs in a series can be fine tuned in parallel, i.e. whereby steps 905, 907, 915 and 917 detect the real currents, compare these with the expected values, calculate the differences, and increase/decrease the drive currents (as necessary) for all of the MRRs during each loop. According to another embodiment, however, one or more MRRs can be tuned prior to the others, or in a particular order. For example, steps 905, 907, 915 and 917 may involve fine tuning a first MRR of the series until the real current matches the expected current, before moving on to a second MRR of the series, and so forth, until proper operation of each MRR in the series is achieved. It is also noted that MRRs form different stages of the optical carrier selector system, i.e. different series' of optical filter devices, can be controlled in parallel by the controller, in any of these ways.

Once it is determined in step 907 that the real dropped frequency at each MRR is the desired one at each MRR, the controller can be configured to check if the real passed through frequency, i.e. corresponding to the wanted frequency for a series of MRRs, is the one wanted at each optical carrier selector (or PIC), step 909. This can be achieved by comparing the current from photodiode PD4 with the expected value for PD4 in Table 2b. If not, steps 915, 917, 905, 907 and 909 can be repeated until it is determined that the correct wanted frequency is being outputted. In this manner, if a mistake occurs while reading the photodiode currents, as it consists in a simple comparison with a threshold reference, then a further check with PD4 can ensure that no mistake has occurred.

Once it is determined in steps 907 and 909 that each MRR is dropping the correct frequency, and that the correct frequency has been obtained at the output, step 911 can be performed to track the current values detected by the photodiodes, for example all photodiodes, to determine if they are constant over time. This step 911 therefore corresponds to a monitoring procedure which is performed after an initial re-tune operation, for example during use of the optical carrier selector to monitor and adjust for any fluctuations.

If during this step the values remain constant, then the controller simply awaits a new tuning frequency request, by looping around steps 913 and 911. If during this loop a new tuning request is received, the whole procedure can commence again in step, 901.

If it is determined in step 911 that the current values do not remain constant, for example due to a drift caused by some factor such as temperature drift, then in step 919 the difference is calculated between the real detected currents from the photodiodes located at the drop ports (e.g. photodiodes PD1 to PD4 of FIG. 6) and the ones expected from look-up Table 2b. The thermistor current can be increased or decreased according to the sign of the calculated difference at the drop port of each MRR, step 921, and the currents re-checked in steps 905, 907, 909, 911 etc.

Figure 10:
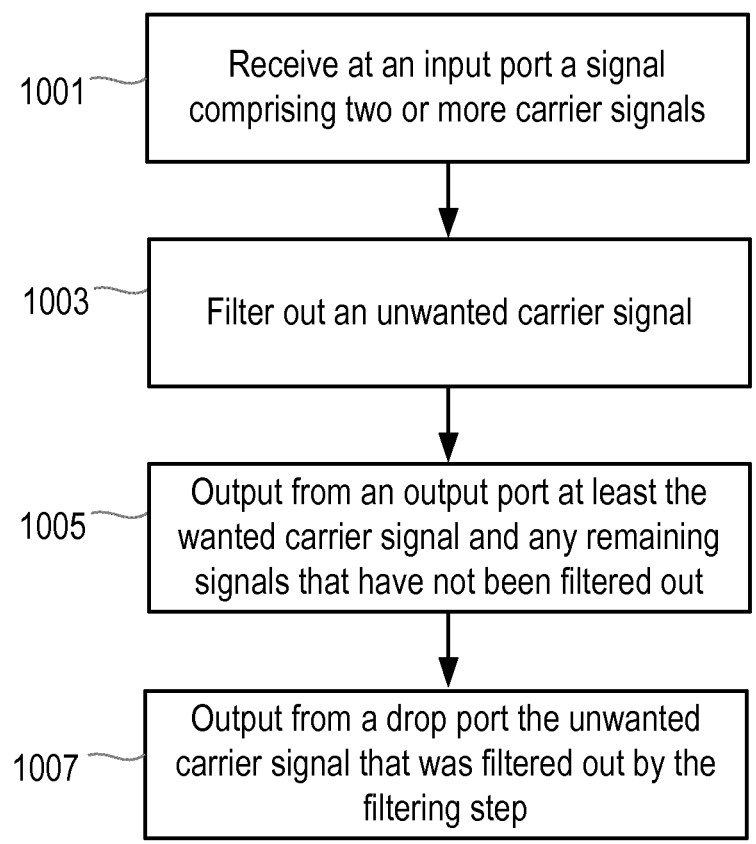
FIG. 10 shows the steps performed by another embodiment of the present invention.

From the above it can be seen that, at a basic level, an embodiment of the invention performs the steps shown in FIG. 10, for controlling the operation of one or more stages of an optical carrier selector system, wherein each stage of an optical carrier selector system comprises a series of optical filter devices ($OFD_1$-$OFD_{N-1}$) for selecting a wanted carrier signal ($f_W$) from a multi-carrier signal comprising multiple carrier signals. The method comprises, at each optical filter device, performing the steps of receiving at an input port a signal comprising two or more carrier signals, step 1001, filtering out an unwanted carrier signal, step 1003, outputting from an output port at least the wanted carrier signal and any remaining signals that have not been filtered out, step 1005, and outputting from a drop port, step 1007, the unwanted carrier signal ($f_{UW}$) that was filtered out by the filtering step.

The method may further comprise the step of monitoring the optical power of the unwanted carrier signal being filtered out by a respective optical filter device (OFD). In one example, the method further comprises the steps of using the monitored optical power to determine whether the correct unwanted carrier signal has been filtered out by a respective optical filter device (OFD), and/or controlling the fine tuning of one or more filter characteristics of the respective optical filter device.

According to embodiments of the invention, the tunable optical filter devices in the form of MRRs can be implemented, for example, on a Silicon over Insulator (SOI) platform. SOI is a mature, CMOS-compatible, viable technology for the implementation of compact, cost effective, versatile MRR-based optical filters for a wide range of applications. An example of one application is a telecom/datacom application, as described for example in a paper by F. Xia, et al, entitled "Ultra-compact high order ring resonator filters using submicron silicon photonic wires for on-chip optical interconnects," Opt. Express, vol. 15, no. 19, pp. 11 934-11 941, 2007. Another example of an application is that of microwave photonics, for example as described in a paper by J. Pozo and et al., "Silicon on insulator photonic integrated sensors: On-chip sensing and interrogation," in Transparent Optical Networks (ICTON), 2011 13th International Conference, 2011. A further example of an application is that of sensing, for example as described in a paper by A. Yariv, "Critical coupling and its control in optical waveguide ring resonator systems," Photonics Technology Letters, IEEE, vol. 14, no. 4, pp. 483 to 485, 2002.

SOI-based MRRs can be designed to operate either as band-pass or band-rejecting filters. Filters operating in notch configuration (i.e., band-rejecting) with very high suppression ratio can be designed in a simple layout. Due to the strong thermo-optic effect, responsible for a change in the material refractive index with temperature, the central frequency of the notch filter can be tuned over a relatively wide bandwidth with low power consumption, for practical and flexible carrier rejection operation. A basic configuration of a MRR filter is represented by two silicon wires forming the input/output bus waveguide which are coupled to a ring cavity, similarly implemented with a circular silicon waveguide, as schematized above in FIG. 4a. Typically, a strip waveguide is formed by deep-etching a layer of silicon which is deposited over an oxide substrate layer, by using either e-beam or optical lithography and reactive ion etching.

Light propagates in the waveguide with an effective refractive index $n_{eff}$ which depends on the waveguide geometry. Due to the high refractive index jump between the core and cladding layers, strong lateral and vertical confinement in the waveguide is achieved, which allows the radiation loss due to bends in the waveguide to be kept very low, enabling the realization of low-loss, high-quality, compact ring resonators. The MRR-based filter depicted in FIG. 4a presents an input port and two output ports, namely the through and drop ports. Due to the interaction of the optical field propagating in the straight and ring waveguides, and the resonant behaviour of the ring cavity, light coupled into the ring from the input port which matches a resonant wavelength of the cavity is transferred to the drop port.

Correspondingly, a notch (i.e., a reduction in the transmission) appears in the transmitted spectrum at the through port. The field suppression at the through port in this resonant case can be made very high by realizing a so-called critical-coupling condition. This allows strong inter-subcarrier cross-talk reduction, which is the main advantage of the through port with respect to the drop port. Several periodic notches are present in the transmitted spectrum at the through port, in correspondence of the ring resonant frequencies. At frequencies away from resonance, most of the signal is let past at the through port. The main parameters of the MRR filter operating in band-rejection mode are thus the width and depth of the notches at resonances, and the frequency separation between adjacent notches, i.e. the free spectral-range (FSR). In particular, the spectral properties of the MRR-based filter are defined by its physical length and the overall loss mechanisms in the ring waveguide (which includes the propagation loss, the coupling to the bus waveguides, and the additional radiation losses in the bend waveguide).

Figure 11:
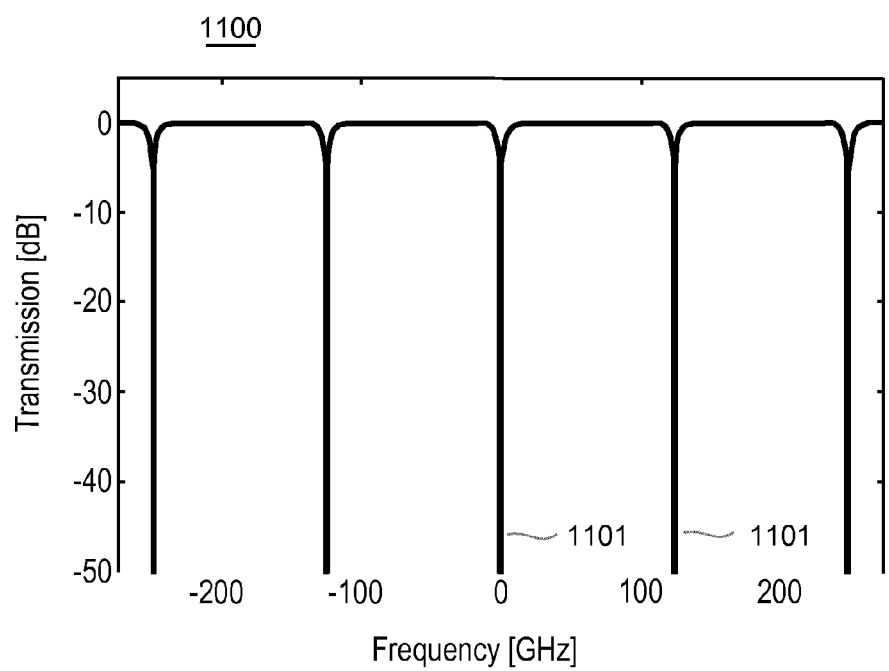
FIG. 11 illustrates the transmission characteristics of a single MRR.

The transmission at the through port of a single ring structure designed to operate in the 1.55 nm spectral region 1100, for example, is shown in FIG. 11, where deep periodic notches 1101, each in correspondence of the ring resonances, can be appreciated.

Numerical analysis for the design of MRRs has been carried out by using commercial software based on the solution of Maxwell equations.

The ring has been dimensioned such that the FSR of the cavity matches (N−1) $dv_{max}$, N being the number of carriers (N=4 in this case) and $dv_{max}$ the maximum foreseen carrier frequency separation (for example 37.5 GHz). The rejection bandwidth of a single notch (as shown in detail in FIG. 4b above) has been designed to provide negligible loss for the selected carrier while ensuring strong suppression for the adjacent ones when the frequency separation between carriers is $dv_{min}$ (the minimum foreseen carriers frequency separation, for example 12.5 GHz in the described embodiments). As shown in FIG. 4b, the attenuation at 12.5 GHz from the resonant frequency is about 0.3 dB. Considering that the selected subcarrier experiences the attenuation due to two adjacent notches (apart for the outermost carriers) and neglecting the attenuation due to furthest resonances, the additional loss for the selected carrier would be less than 1 dB. For the design parameters leading to the spectra of FIG. 11, a ring radius of 95 μm was used, and power coupling coefficients with top and bottom straight waveguides of 0.13 and 0.06, respectively. A propagation loss coefficient of $\alpha_{prop}$=2.7 dB/cm, has been considered, whereas additional losses due to bends and coupler have been set to 0.2 dB. The values of losses are compliant with those reported for available Silicon platforms for the realization of integrated photonic circuits, for example as described in a paper by R. Amatya, et al. entitled "Low power thermal tuning of second order micro ring resonators," in Lasers and Electro-Optics, 2007, CLEO 2007, conference in 2007.

A single-mode rectangular waveguide at 1.55 μm, with 450 nm of width and 220 nm height has been considered in the simulation. The value of $n_{eff}$ has been computed using commercial software based on the solution of Maxwell's equations; the same program can be used to determine the distance between ring and bus waveguides providing the optimal coupling coefficients.

The tunability of the device via the thermo-optic effect is optionally considered in order to measure the required power consumption and to check if different attenuation due to refractive index variation can cause loss change on the selected wavelength introducing errors in the monitoring system.

It is noted, however, that thermal tuning of the central frequency of each filter in the series of rings can be independently achieved by placing a metallic heater above the device, as described in the embodiments above, and making current flow through the heater contacts to produce a local change of temperature and a corresponding variation of the effective length of the ring (through a change of its refractive index). An increase in the temperature thus produces a shift toward longer wavelengths of the resonant wavelengths.

Figure 12:
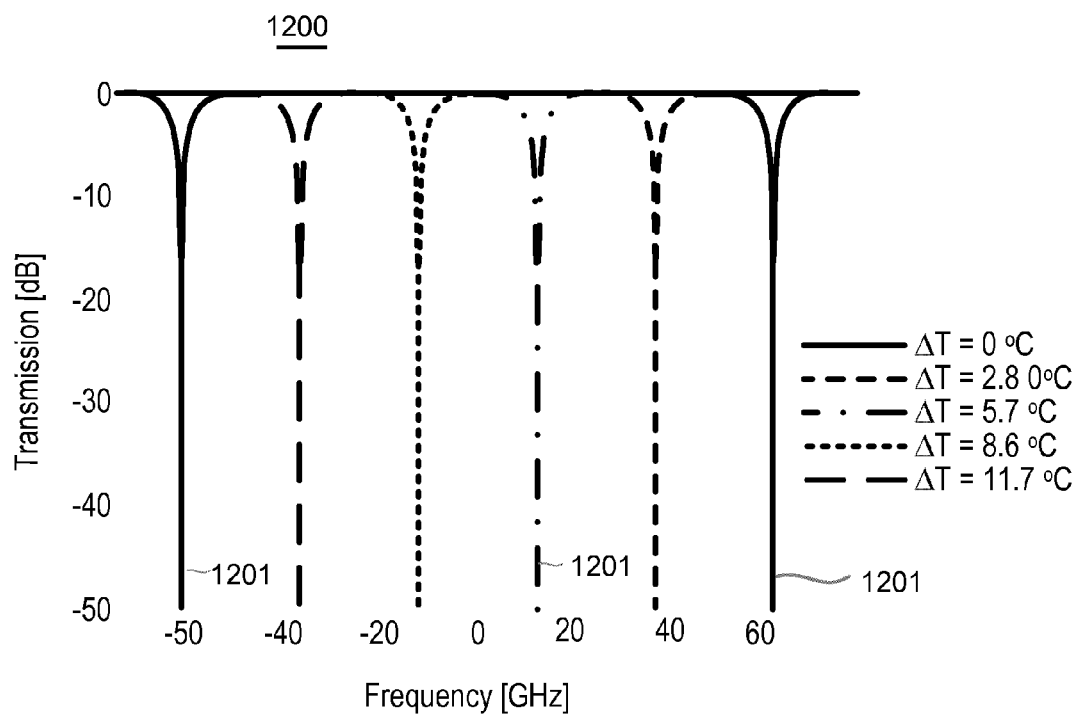
FIG. 12 illustrates how the transmission characteristics are tunable within a free spectral range (FSR) versus temperature.

The change of the effective refractive index due to temperature change has been taken into account by using the thermo-optic coefficient of silicon. The results of the simulation are reported in FIG. 12, where the through port output spectrum 1200 with resonances 1201 for different values of temperature variations is shown. A full resonance shift over one FSR can be realized with a temperature change of about 15° C., which can be achieved with a power consumption of a few mW (driving current of a few mA, to be generated by the controller) with an optimized heater design without affecting the effective optical power at the monitoring points. An example of an optimized heater design is described in a paper by L. Chen, et al, "Compact bandwidth-tunable micro ring resonators," Opt. Express, vol. 32, no. 22, pp. 3361-3363, 2007.

From the above simulated values, it can be evaluated that only a few milli-amperes of current adjustment are needed to drive the thermal heaters to slightly adjust the effective coupling coefficient, for ensuring the strong field suppression at resonance provided by the critical coupling condition.

The simulated values confirm the feasibility of a dense carrier selector having the control and monitoring functions provided by embodiments of the present invention, and their applicability in photonic integrated circuitry where low currents are requested to perform monitoring and control functions.

The embodiments described herein are relevant for the generation of multicarrier super-channels (e.g., at 1 Tb/s), and permit super-channel carriers to be selected, and directed to an appropriate output, for example where each carrier is modulated by specific data. The embodiments can have a particular design optimized for photonic integration technologies: for instance CMOS photonics. The embodiments are also suitable for flex-grid networks where carrier spacing may change depending on the traffic characteristics.

The embodiments of the invention have the advantage of being cheaper than other possible solutions: i.e. no costly hardware is necessary, since a simple controller in the form of a simple microprocessor can be used, rather than more complex signal processing devices for monitoring and controlling carrier selector performance The embodiments above therefore provide a solution for carrier selection which may be integrated with the source, and also be implemented with super-channels having tunable carrier spacing, for example in flex-grid optical networks.

The embodiments of the invention provide an improved method of monitoring and controlling the performance of an optical carrier selector system, for example when applied to select carriers in dense WDM combs.

Aspects of the invention may comprise an arrangement of a plurality of series of optical filter devices, each series providing a single spectral component. The arrangement may optionally comprise a multi-wavelength source, from which the output spectral components may be selected according to the configuration of the filter devices in the series.

In some aspects, the arrangement described provides a source of optical components which is colorless (an arbitrary wavelength can be set on each port), directionless (each wavelength can be sent to an arbitrary port) and contentionless (same wavelength can be sent to different ports). This is provided at low implementation cost.

Although reference is made to various look-up tables, it is noted that the separate look-up tables may be combined to provide the various functions.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. An optical carrier selector system for selecting a wanted carrier signal from a multi-carrier signal comprising a plurality of carrier signals, the optical carrier selector system comprising:
   a series of optical filter devices, wherein each optical filter device of the series comprises:
      an input port for receiving a signal comprising two or more carrier signals, each optical filter device being configured to filter out an unwanted carrier signal;
      an output port for outputting at least the wanted carrier signal and any remaining signals that have not been filtered out by that particular optical filter device;
      a drop port for outputting the unwanted carrier signal that is being filtered out by the respective optical filter device; and
   one or more monitoring devices coupled to one or more respective drop ports, for monitoring the optical power of the unwanted carrier signal being filtered out by a respective optical filter device.

2. An optical carrier selector system as claimed in claim 1, wherein each monitoring device is used to monitor whether the correct unwanted carrier signal has been filtered out by a respective optical filter device, and/or to control fine tuning of one or more filter characteristics of the respective optical filter device.

3. An optical carrier selector system as claimed in claim 1, further comprising a monitoring device coupled to the output port of the optical filter device in the final stage of the series of optical filter devices, for monitoring the optical power of the wanted carrier signal.

4. An optical carrier selector system as claimed in claim 1, wherein the optical filter devices are arranged in the series such that adjacent optical filter devices remove carrier signals having non-adjacent frequencies.

5. An optical carrier selector system as claimed in claim 4, wherein the first and second optical filter devices of the series remove first and second unwanted carrier signals having frequencies which are adjacent to the frequency of the wanted carrier signal.

6. An optical carrier selector system in claim 1, wherein the system is configured to provide each carrier signal of the multi-carrier signal with a different optical power level.

7. An optical carrier selector system as claimed in claim 1, further comprising an optical shaping filter adapted to generate imbalance in carrier signals of the multi-carrier signal, prior to the multi-carrier signal being received by the series of optical filter devices.

8. An optical carrier selector system as claimed in claim 1, further comprising one or more further series of optical filter devices, each of the one or more further series of optical filter devices being configured to select a respective wanted carrier signal from the multi-carrier signal.

9. An optical carrier selector system as claimed in claim 1, further comprising a controller for controlling the operation of one or more series of optical filter devices, wherein the controller is configured to selectively control which carrier signal frequency is to be filtered out at each optical filter device in a series.

10. An optical carrier selector system as claimed in claim 1, wherein each optical filter device comprises a micro ring resonator, MRR, and wherein a controller is configured to control the operation of a MRR by controlling the drive current of a heating element associated with the MRR.

11. An optical carrier selector system as claimed in claim 10, wherein the controller is configured to control the operation of each MRR in a series based on a set of current values $I_{Rx,h,k}$ stored in a first look-up table, each current value representing a current for driving a heating element of a respective MRR, where "Rx" represents a particular series of MRRs, where "h" represents the number of the MRR in a path towards the output of the series, and "k" represents a frequency of a carrier signal which is to be filtered out by a MRR.

12. An optical carrier selector system as claimed in claim 1, wherein a controller is configured to:
   monitor the optical power level received from a drop port of an optical filter device;
   check for proper operation of the optical filter device by comparing a monitored current value $I_{IIc}$ with a set of predetermined current values stored in a second look-up table, where "X" represents a particular series of MRRs, where "I" represents the number of the MRR in a path towards the output of the series, and "k" represents a frequency of a carrier signal which is to be filtered out by a MRR.

13. An optical carrier selector system as claimed in claim 1, wherein a controller is further configured to:
   monitor the optical power level of the wanted carrier signal being output from the final optical filter device of a series: and
   check for proper operation of the series of optical filter devices by comparing the optical power level of the wanted carrier signal with a predetermined optical power level.

14. An optical carrier selector system as claimed in claim 1, wherein a controller is configured to fine tune the operation of an optical filter device, wherein the controller is configured to receive an indication over time of the power level at the drop port, and if the power level is determined to vary over time, the controller is configured to tune the optical filter device to correct the variation.

15. A method of controlling the operation of one or more stages of an optical carrier selector system, wherein each stage of an optical carrier selector system comprises a series of optical filter devices for selecting a wanted carrier signal from a multi-carrier signal comprising multiple carrier signals, the method comprising, at each optical filter device, performing the steps of:
   receiving at an input port a signal comprising two or more carrier signals;
   filtering out an unwanted carrier signal;
   outputting from an output port at least the wanted carrier signal and any remaining signals that have not been filtered out;
   outputting from a drop port the unwanted carrier signal that was filtered out by the filtering step; and
   monitoring the optical power of the unwanted carrier signal being filtered out by a respective optical filter device.

16. A method as claimed in claim 15, further comprising the steps of using the monitored optical power to determine whether the correct unwanted carrier signal has been filtered out by a respective optical filter device, and/or controlling the fine tuning of one or more filter characteristics of the respective optical filter device.

17. An optical carrier selector arrangement comprising a plurality of optical carrier selector systems, each optical carrier selector systems configured to select a wanted carrier signal from a multi-carrier signal comprising a plurality of carrier signals, the optical carrier selector system comprising:
   a series of optical filter devices, wherein each optical filter device of the series comprises:
      an input port for receiving a signal comprising two or more carrier signals, each optical filter device being configured to filter out an unwanted carrier signal;
      an output port for outputting at least the wanted carrier signal and any remaining signals that have not been filtered out by that particular optical filter device;
      a drop port for outputting the unwanted carrier signal that is being filtered out by the respective optical filter device; and
      one or more monitoring devices coupled to one or more respective drop ports, for monitoring the optical power of the unwanted carrier signal being filtered out by a respective optical filter device.

* * * * *